(12) United States Patent
Pradhani et al.

(10) Patent No.: US 9,558,100 B2
(45) Date of Patent: Jan. 31, 2017

(54) MONITORING ACTIVITIES OF A SOFTWARE APPLICATION

(71) Applicant: Tata Consultancy Services Limited, Mumbai, Maharashtra (IN)

(72) Inventors: Padmalaya Pradhani, Odisha (IN); Bhanunjya Kumar Rout, Odisha (IN); Debabrata Panda, Odisha (IN); Rakesh Ranjan Sahoo, Odisha (IN); Mihir Prasad Mohapatra, Odisha (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 118 days.

(21) Appl. No.: 14/576,772

(22) Filed: Dec. 19, 2014

(65) Prior Publication Data
US 2016/0055075 A1 Feb. 25, 2016

(30) Foreign Application Priority Data
Aug. 25, 2014 (IN) .......................... 2716/MUM/2014

(51) Int. Cl.
*G06F 11/00* (2006.01)
*G06F 11/36* (2006.01)
*G06F 11/30* (2006.01)
*G06F 11/34* (2006.01)
*G06F 11/32* (2006.01)

(52) U.S. Cl.
CPC ....... *G06F 11/3624* (2013.01); *G06F 11/3051* (2013.01); *G06F 11/323* (2013.01); *G06F 11/3409* (2013.01); *G06F 11/3419* (2013.01); *G06F 11/3495* (2013.01); *G06F 11/3616* (2013.01); *G06F 2201/81* (2013.01); *G06F 2201/865* (2013.01)

(58) Field of Classification Search
CPC .......................... G06F 11/3624; G06F 11/3616
USPC ............................ 714/47.2, 47.3, 48, 49, 50
See application file for complete search history.

(56) References Cited

U.S. PATENT DOCUMENTS

| | | | |
|---|---|---|---|
| 8,819,856 B1* | 8/2014 | Tiffe ...................... | G06F 21/125 |
| | | | 726/31 |
| 9,104,392 B1* | 8/2015 | Dunagan ........... | G06F 17/30528 |
| 2009/0172653 A1* | 7/2009 | Elliott ..................... | G06F 8/443 |
| | | | 717/148 |
| 2014/0165054 A1* | 6/2014 | Wang .................. | G06F 9/45558 |
| | | | 718/1 |

* cited by examiner

*Primary Examiner* — Dieu-Minh Le
(74) *Attorney, Agent, or Firm* — Merchant & Gould P.C.

(57) ABSTRACT

Disclosed are a method and a system for monitoring one or more activities offered by a software application in a computer network. The method comprises monitoring a response time for one or more activities. The one or more activities are performed by a software application. The method further comprises comparing the response time of the one or more activities with a corresponding pre-defined threshold time. The method also comprises detecting a faulty activity of the one or more activities based on the comparison. The method further comprises highlighting a code snippet corresponding to the faulty activity in a source code of the software application.

11 Claims, 3 Drawing Sheets

MONITORING ACTIVITIES OF A SOFTWARE APPLICATION

CROSS-REFERENCE TO RELATED APPLICATIONS AND PRIORITY

The present application does claim priority from an Indian application number 2716/MUM/2014 filed on 25 Aug. 2014.

TECHNICAL FIELD

The present subject matter described herein, in general, relates to monitoring one or more activities offered by a software application in a computer network. In particular, the present subject matter described herein relates to highlighting a faulty activity of one or more activities offered by the software application.

BACKGROUND

With the development of technologies associated with the Internet, various web services are being offered on the Internet. The web services may be accessed using standard Internet protocols such as Hyper Text Transfer Protocol (HTTP), extensible Markup Language (XML), Simple Object Access Protocol (SOAP), etc., over standard interfaces. These web services may be diversified and complex in nature. Therefore, these web services may require frequent monitoring to check whether or not these web services are operating accurately and efficiently.

The purpose of the monitoring a software application is to provide an uninterrupted and efficient operation of the web services while minimizing costs, risks, and side-effects of the monitoring. The purpose of the monitoring may be for improving efficiency, reducing cost, improved service availability and quality.

SUMMARY

This summary is provided to introduce aspects related to systems and methods for monitoring one or more activities offered by a software application in a computer network and the aspects are further described below in the detailed description. This summary is not intended to identify essential features of the claimed subject matter nor is it intended for use in determining or limiting the scope of the claimed subject matter.

In one implementation, a method for monitoring one or more activities of a software application in a computer network is disclosed. The method comprises monitoring a response time for the one or more activities. The one or more activities are performed on a software application. The method further comprises comparing the response time of the one or more activities with a corresponding pre-defined threshold time. The method also comprises detecting a faulty activity of the one or more activities based on the comparison. The faulty activity is detected based on the response time. If the response for an activity is greater than the corresponding pre-defined threshold time, the activity may be referred to as a faulty activity. The method further comprises highlighting a code snippet corresponding to the faulty activity in a source code of the software application. The method also comprises modifying the code snippet corresponding to the faulty activity. In one implementation, the code snippet is modified using a predefined program library.

In one implementation, a system for monitoring one or more activities offered by a software application in a computer network is disclosed. The system comprises a memory and a processor. The memory stores program instructions. The processor executes the program instructions to monitor a response time for one or more activities. The one or more activities are performed on a software application. The processor further executes the program instructions to compare the response time of the one or more activities with a corresponding pre-defined threshold time. The processor also executes the program instructions to detect a faulty activity of the one or more activities based on the comparison. The faulty activity is detected based on the response time. If the response for an activity is greater than the corresponding pre-defined threshold time, the activity may be referred to as a faulty activity. The processor further executes the program instructions to highlight a code snippet corresponding to the faulty activity in a source code of the software application.

In one implementation, a non-transitory computer readable medium embodying a program executable in a computing device for monitoring one or more activities offered by a software application in a computer network is disclosed. The program comprises a program code a program code for monitoring a response time for one or more activities performed on a software application. The program further comprises a program code for comparing the response time of the one or more activities with a corresponding pre-defined threshold time. The program also comprises a program code for detecting a faulty activity of the one or more activities based on the comparison. The program further comprises a program code for highlighting a code snippet corresponding to the faulty activity in a source code of the software application.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for monitoring one or more activities offered by a software application in a computer network are described. At first, a response time for one or more activities offered by the software application may be monitored by a processor. The response time may be understood as a time span from a start of the one or more activities to an end of the one or more activities.

Subsequently, the response time of the one or more activities may be compared with a corresponding pre-defined threshold time. The pre-defined threshold time may be set manually, for example by an administrator. While comparing, an activity having a response time greater than the pre-defined threshold time may be referred to as a faulty activity. The faulty activity may be linked with a corresponding code snippet in the source code of the software application. Post linking the code snippet corresponding to the faulty activity, the code snippet may be highlighted in order to alert the administrator for the faulty activity.

While aspects of described system and method for highlighting a code snippet corresponding to a faulty activity of one or more activities offered by a software application in a computer network may be implemented in any number of different computing systems, environments, and/or configurations, the embodiments are described in the context of the following exemplary system.

Figure 1:
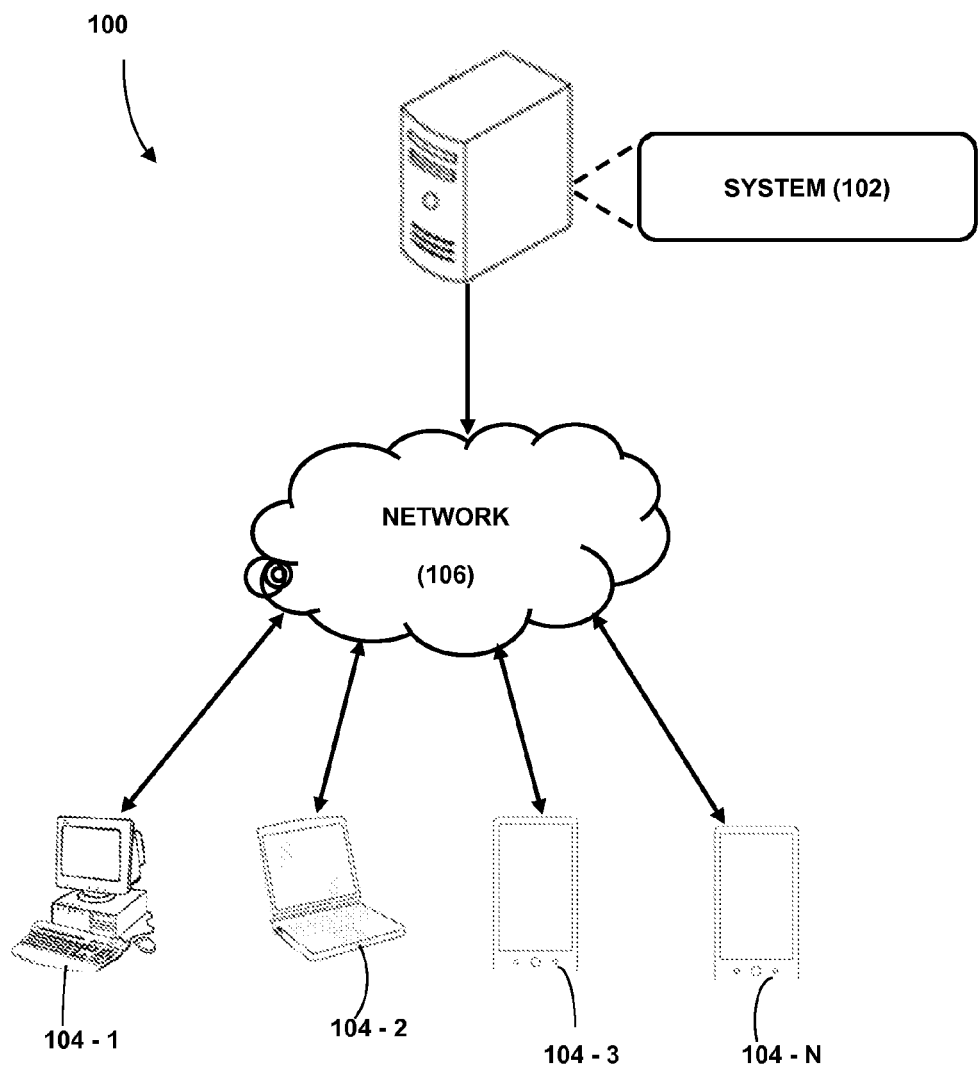
FIG. 1 illustrates a network implementation of a system for monitoring one or more activities offered by a software application in a computer network.

Referring now to FIG. 1, a network implementation 100 of a system 102 for monitoring one or more activities offered by a software application in a computer network is illustrated, in accordance with an embodiment of the present subject matter. In one embodiment, the system 102 may highlight the code snippet corresponding to the faulty activity in the source code of the software application.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
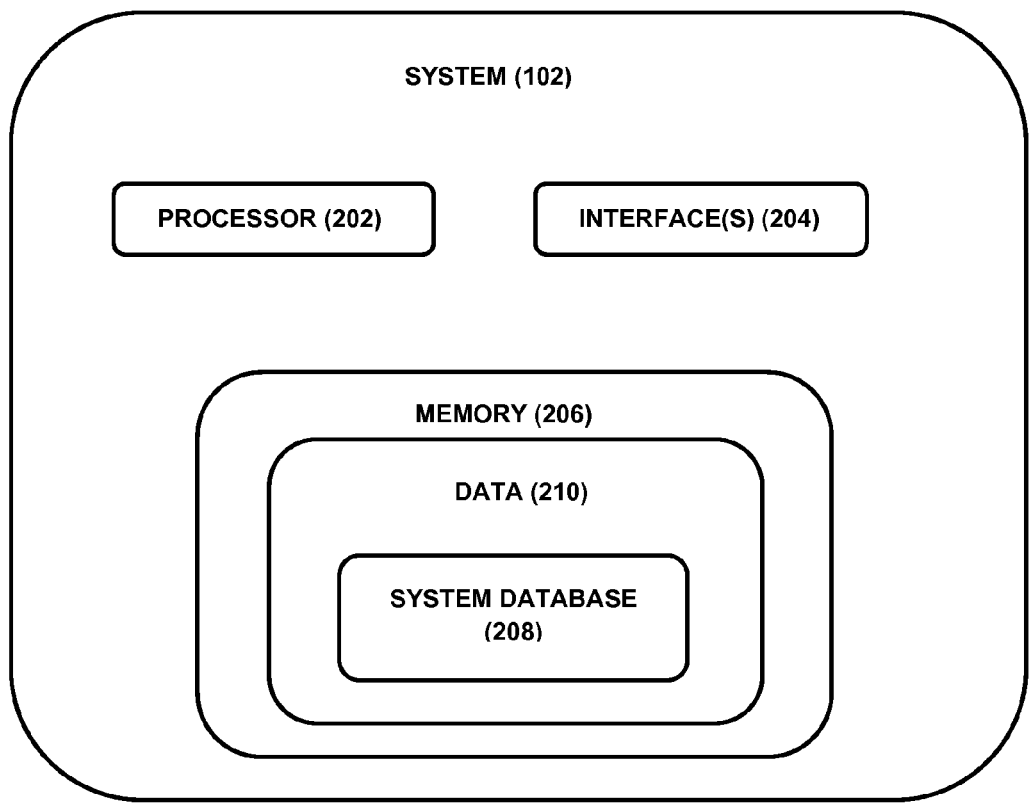
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include data 210.

The data 210, amongst other things, serves as a repository for storing data processed, received, and generated during monitoring one or more activities offered by the software application in the computer network. The data 210 may also include a system database 208.

In one implementation, at first, a user may use the client device 104 to access the system 102 via the I/O interface 204. Alternatively, the system 102 may be accessed by a user directly with the help of the I/O interface 204. The user may register themselves using the I/O interface 204 in order to use the system 102. The working of the system 102 may be explained in detail in 3 explained below.

The system 102, hosting a software application may monitor the response time for the one or more activities preformed on the software application. The response time may be understood as a time span from a start of the one or more activities to an end of the one or more activities. The system 102 may count a number of executions of a source code corresponding to the one or more activities. The number of executions of the source code may be stored in the memory 206. Subsequently, the system 102 may compare the response time of the one or more activities with the corresponding pre-defined threshold time. In one embodiment, the system 102 may choose the one or more activities for comparing the response time of the one or more activities with the corresponding pre-defined threshold time based upon the number of executions of the source code. The system 102 may further use the response time as a basis to detect a faulty activity. For example, if the response time of an activity of the one or more activities is greater than the corresponding pre-defined threshold time, the activity may be referred to as a faulty activity. The activity may be any activity performed on the software application. For example, a login activity in a web service, a payment check out activity in a payment gateway, an account checking activity, and the like. Further, the threshold time may depend upon the traffic in the computer network. Based on the traffic in the computer network, the threshold time for each of the one or more activities may be set by the administrator. For example, the threshold time for the login activity may be set at 8 seconds for a light traffic (such as a hundred thousand users) in the computer network. Similarly, the threshold time for the login activity may be set at a value greater than 8 seconds for a high traffic (such as a million users) in the computer network. Post detecting the faulty activity, the system 102 may link the faulty activity with the corresponding code snippet.

The faulty activity may be linked with the corresponding code snippet using a dynamic code instrumentation technique. For example, a java dynamic bytecode instrumentation technique may be used as the dynamic code instrumentation technique. In one embodiment, the source code may be instrumented by using the dynamic code instrumentation technique. The instrumented source code may be stored in a file within a directory. For example, the instrumented source code may be stored in service1.java within instr.dir. Content of the file within the directory may be referred to as the code snippet corresponding to the faulty activity. Post detection of the faulty activity, the code snippet may be highlighted in order to alert the software developer/tester of the faulty activity. After highlighting the code snippet, a report for the one or more such faulty activities may be generated. In one embodiment, the report may be shown on a dashboard. The report may comprise a name of the one or more activities, the response time for one or more activities, a threshold value of response time for the one or more activities, and status of the one or more activities. The status indicates whether response time of an activity of one or more activity is within the corresponding pre-defined threshold time or not.

In order to explain the working of the system 102, a non-limiting example may be used. The example uses Table 1 to illustrate the report for the one or more activities in an E-commerce environment. In this example, the one or more activities may include logging in My account, Checking out, creating Wish-list, Order items, and the like. The pre-defined threshold time for My account, Checkout, Wish-list and Order may be set at 8 seconds, 10 seconds, 8 seconds, and 8 seconds respectively. It is clear from the Table 1 that the response time for My account, Checkout, Wish-list and Order are 3 seconds, 6 seconds, 20 seconds, and 5 seconds respectively. The response time of the Wish-list is 20 seconds. The response time (20 seconds) for the Wish-list is greater than the pre-defined threshold time (8 seconds) for the Wish-list. Therefore, the dashboard shows a status of the Wish-list as "Failed". Hence, the status "Failed" of the Wish-list indicates that the Wish-list is a faulty activity. The dashboard may show a number of activities, a number of activities up, and a number of faulty activities. For example, in the present example, the dashboard shows the number of activities is 4, the number of activities up is 3, and the number of faulty activity is 1.

TABLE 1

A dashboard showing activities, pre-defined threshold time for the activities, the response time for the activities, and status of the activities
DASHBOARD

| Number of Activities: 4 | | Number Activities up: 3 Pre-defined Threshold time | Number of Faulty Activity: 1 Response time | | |
|---|---|---|---|---|---|
| Name | Uptime | | | Activities | Status |
| My account | 2 hr 5 min 10 sec | 8 seconds | 3 seconds | My account | OK |
| Checkout | 3 hr 15 min 02 sec | 10 seconds | 6 seconds | Checkout | OK |
| Wish-list | — | 8 seconds | 20 seconds | Wish-list | Failed |
| Order items | 3 hr 15 min 02 sec | 8 seconds | 5 seconds | Order items | OK |

It is to be understood that the system 102 may highlight the code snippet in order to alert a software programmer who needs to fix the code snippet for rectifying the response time of faulty activity. The software programmer/tester may modify the code snippet in order to maintain the response time of the faulty activity within pre-defined threshold time. In another implementation, the programmer may further disable the faulty activity in order to erase a portion of the memory 206 for improving the system performance.

Figure 3:
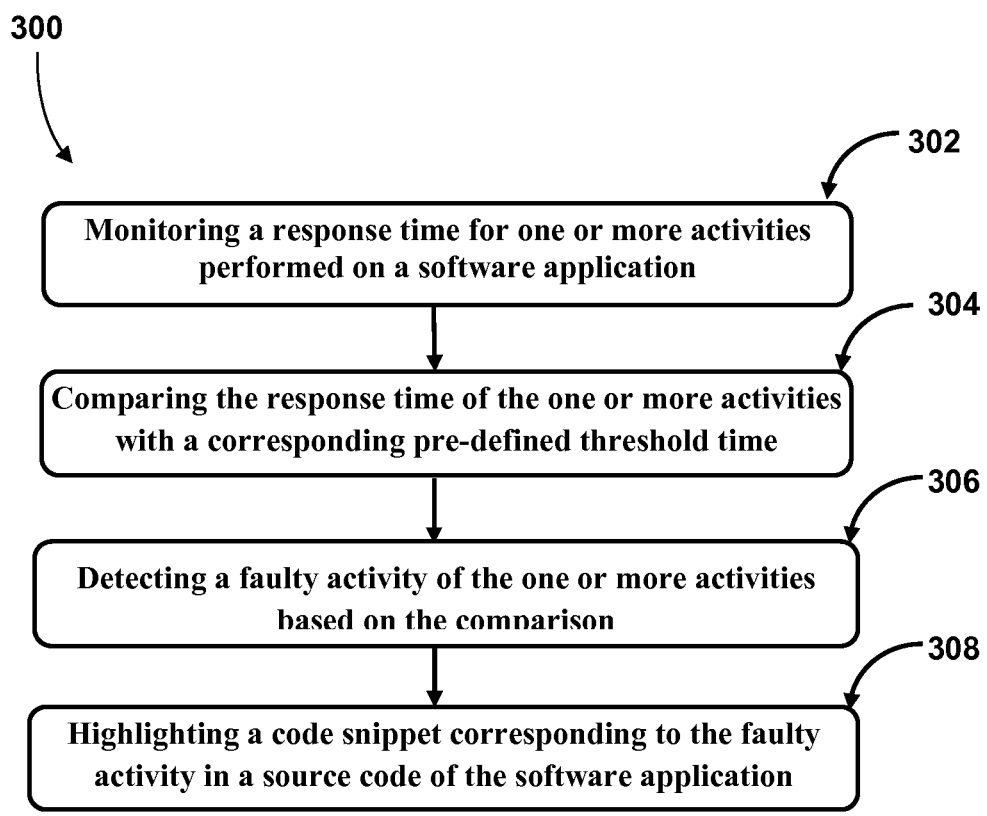
FIG. 3 shows a flowchart for illustrating a method for monitoring one or more activities offered by a software application in a computer network, in accordance with an embodiment of the present subject matter.

Referring now to FIG. 3, a method 300 for monitoring one or more activities offered by a software application in a computer network is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the response time for the one or more activities may be monitored. The response time may be understood as a time span from a start of the one or more activities to an end of the one or more activities. Further, the one or more activities may be performed on a software application. The software application may comprise a source code for performing the one or more activities. The source code may comprise a plurality of code snippets corresponding to the one or more activities.

At block 304, the response time of the one or more activities may be compared with a corresponding pre-defined threshold time. In one implementation, the pre-defined threshold time may be stored in the database 208. The pre-defined threshold time may be set manually, for example by a software programmer/tester. In one implementation, the pre-defined threshold time may be stored in the database 208.

At block 306, a faulty activity of the one or more activities may be detected based on the comparison. For example, if the response time of an activity of the one or more activities is greater than the corresponding pre-defined threshold time, the activity may be referred to as the faulty activity.

At block 308, a code snippet corresponding to the faulty activity may be highlighted. The code snippet may be a part of a source code of the software application. In order to highlight the code snippet, the faulty activity may be linked with a corresponding code snippet in the source code of the software application at run time.

Although implementations for methods and systems for monitoring one or more activities offered by a software application in a computer network have been described in language specific to structural features and/or methods, it is to be understood that the appended claims are not necessarily limited to the specific features or methods described. Rather, the specific features and methods are disclosed as examples of implementations for monitoring one or more activities offered by a software application in a computer network.

We claim:

1. A method for monitoring one or more activities of a software application in a computer network, the method comprising:

monitoring, by a processor, a response time for one or more activities performed by a software application;

comparing, by the processor, the response time of the one or more activities with a corresponding pre-defined threshold time;

detecting a faulty activity of the one or more activities based on the comparison;

highlighting a code snippet corresponding to the faulty activity in a source code of the software application; and modifying the code snippet corresponding to the detected faulty activity using a predefined program library.

2. The method of claim 1, wherein the response time of the faulty activity is greater than the pre-defined threshold time.

3. The method of claim 1, further comprising linking the faulty activity with the corresponding code snippet prior to highlighting the code snippet.

4. The method of claim 1, further comprises generating a report comprising a name of the one or more activities, a threshold value of the one or more activities, the response time for one or more activities, and status of the one or more activities.

5. The method of claim 3, wherein the faulty activity is linked with the corresponding code snippet using a dynamic byte code instrumentation technique.

6. The system for highlighting a code snippet corresponding to a faulty activity of one or more activities of a computer network, the system comprising;

a memory;

a processor coupled to the memory, wherein the processor executes program instructions, stored in the memory, to:

monitor a response time for one or more activities performed by a software application;

compare the response time of the one or more activities with a corresponding pre-defined threshold time;

detect a faulty activity of the one or more activities based on the comparison;

highlight a code snippet corresponding to the faulty activity in a source code of the software application; and modify the code snippet corresponding to the detected faulty activity using a predefined program library.

7. The system of claim 6, wherein the response time of the faulty activity is greater than the pre-defined threshold time.

8. The system of claim 6, wherein the processor further executes the program instructions to link the faulty activity with the corresponding code snippet prior to highlighting the code snippet.

9. The system of claim 6, wherein the processor further executes the program instructions to generate a report comprising a name of the one or more activities, a threshold value of the one or more activities, the response time for one or more activities, and status of the one or more activities.

10. The system of claim 9, wherein the faulty activity is linked with the corresponding code snippet using a dynamic byte code instrumentation technique.

11. A non-transitory computer readable medium embodying a program executable in a computing device for highlighting a code snippet corresponding to a faulty activity of one or more activities of a computer network, the program comprising:

a program code for monitoring a response time for one or more activities performed by a software application;

a program code for comparing the response time of the one or more activities with a corresponding pre-defined threshold time;

a program code for detecting a faulty activity of the one or more activities based on the comparison;

a program code for highlighting a code snippet corresponding to the faulty activity in a source code of the software application; and a program code for modifying the code snippet corresponding to the detected faulty activity using a predefined program library.

* * * * *